United States Patent [19]

McAfee

[11] Patent Number: 4,798,052
[45] Date of Patent: Jan. 17, 1989

[54] CONSTANT-CLEARANCE BRAKE PISTON SYSTEM WITH BRAKING PRESSURE INTENSIFIER

[75] Inventor: David D. McAfee, South Bend, Ind.

[73] Assignee: Allied-Signal Inc., Morristown, N.J.

[21] Appl. No.: 47,952

[22] Filed: May 8, 1987

[51] Int. Cl.$^4$ .................... F15B 7/10; F16D 55/02
[52] U.S. Cl. ........................... 60/572; 60/579; 60/590; 188/71.8; 188/370
[58] Field of Search .............. 60/593, 566, 567, 568, 60/569, 572, 579, 590; 92/13.1, 13, 60.5, 81; 91/416, 29, 165, 422, 460, 250; 188/72.4, 71.7, 71.8, 196 A, 370

[56] References Cited

U.S. PATENT DOCUMENTS

| | | | |
|---|---|---|---|
| 2,952,338 | 9/1960 | Oswalt | 188/152 |
| 3,055,456 | 9/1962 | Pfeiffer | 188/73 |
| 3,056,262 | 10/1962 | Huntress et al. | 60/590 |
| 3,125,187 | 3/1964 | Dotto | 188/152 |
| 3,170,543 | 2/1965 | Cook et al. | 188/152 |
| 3,643,763 | 2/1972 | Hay | 188/71.8 |
| 3,643,764 | 2/1972 | Maurice | 188/71.8 |
| 3,645,362 | 2/1972 | Scheibe | 188/71.8 |
| 3,645,364 | 2/1972 | Otto et al. | 188/196 D |
| 3,659,685 | 5/1972 | Stipanovic | 188/72.5 |
| 3,664,468 | 5/1972 | Oka | 188/72.2 |
| 3,995,531 | 12/1976 | Zibrun | 91/416 |
| 3,995,721 | 12/1976 | Chambers | 188/71.8 |
| 4,006,669 | 2/1977 | Price | 92/13.1 |
| 4,208,952 | 6/1980 | Ditlinger | 92/13.1 |
| 4,258,609 | 3/1981 | Conway | 91/416 |
| 4,691,520 | 9/1987 | Osborne | 60/593 |

FOREIGN PATENT DOCUMENTS

| | | | |
|---|---|---|---|
| 56-42730 | 4/1981 | Japan | 188/72.4 |
| 56-52634 | 5/1981 | Japan | 188/72.4 |
| 224253 | 1/1969 | Sweden | 188/196 C |
| 398791 | 9/1973 | U.S.S.R. | 188/196 H |
| 490978 | 11/1975 | U.S.S.R. | 188/351 |
| 1419115 | 12/1975 | United Kingdom | 188/79.5 |

Primary Examiner—Robert E. Garrett
Assistant Examiner—George Kapsalas
Attorney, Agent, or Firm—Larry J. Palguta; Ken C. Decker

[57] ABSTRACT

The hydraulic brake adjuster (10) intensifying and piston assembly (30) include an exterior pressure device (11) which is disposed separate from a piston (32). The exterior pressure device (11) includes a differential area piston (12) receiving actuation fluid pressure and an outlet (26) which communicates fluid pressure to the piston assembly (30). The piston assembly (30) includes a piston bushing (40) received within the piston (32) to define substantially therebetween a pair of longitudinal pressure chambers (50, 95), a recessed piston (60) received within the piston bushing (40) to define therebetween an axial pressure chamber (70), the axial pressure chamber (70) communicating with one (50) of the pair of longitudinal pressure chambers (50, 95), and the one longitudinal pressure chamber (50) receiving actuation fluid pressure. A piston valve (90) is located within an interior opening (97) in the piston (60), the interior opening (97) communicating with the axial pressure chamber (70). The piston valve (90) extends through front (74) and rear (68) wall openings of the piston (60), and is biased by a spring (94) toward the rear wall (66). The rear wall (66) of the piston (60) and the bushing (40) define a portion of the other longitudinal pressure chamber (95) which communicates with the outlet (26) of the exterior pressure device (11).

9 Claims, 1 Drawing Sheet

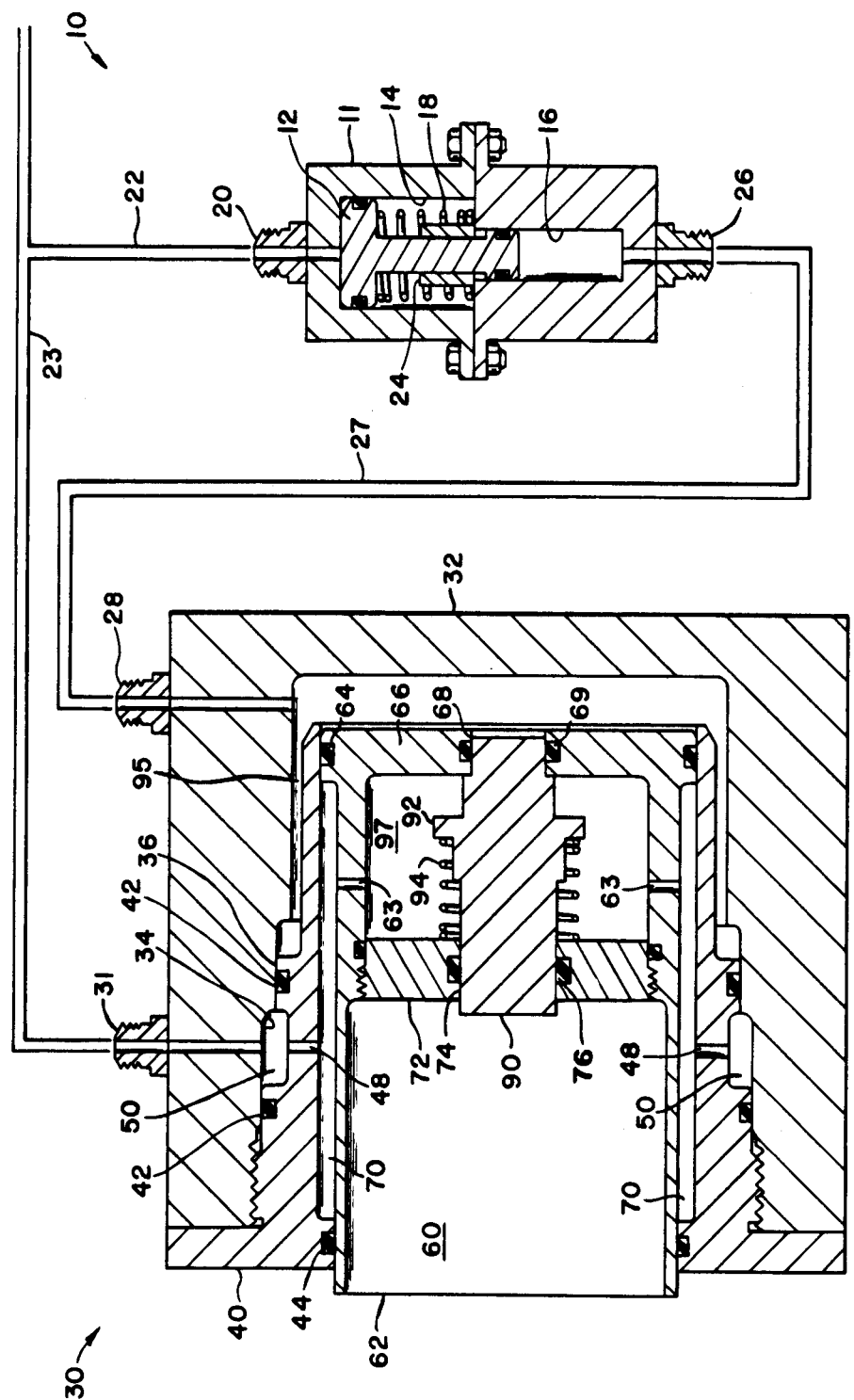

CONSTANT-CLEARANCE BRAKE PISTON SYSTEM WITH BRAKING PRESSURE INTENSIFIER

BACKGROUND OF THE INVENTION

1. Field of the Invention

The hydraulic brake adjuster and piston assembly relate to a braking device which utilizes a hydraulic adjustment to retract the piston away from a braking component.

2. Description of the Prior Art

Prior brake devices often utilize mechanical mechanisms such as springs in order to return the actuated component, typically a piston, away from the brake component upon the release of braking fluid. In order to establish a brake running clearance, the mechanical springs typically retract the piston a fixed distance. Many such spring-operated retraction mechanisms have been provided previously, and it is desirable to provide a lighter, more compact brake design which does not require the utilization of spring mechanisms in order to return the brake to the running clearance. Most brakes utilize hydraulic pressure for actuation thereof, and therefore it would be desirable to utilize hydraulic fluid pressure as a means for establing the running clearance. It is desirable to provide such an hydraulically operated brake with return mechanism for constant pressure brake applications such as helicopter rotor brakes or other applications not requiring a linear relationship between brake inlet pressure and piston force. Because of the manner in which the hydraulic mechanism would operate, it is advantageous to utilize the mechanism where a non-linear pressure relationship is acceptable.

SUMMARY OF THE INVENTION

The present invention comprises an hydraulic brake adjuster and piston assembly, comprising a piston housing having therein a cavity with a cavity surface, a piston bushing disposed in the cavity and defining substantially with the cavity surface a pair of longitudinal pressure chambers, a piston with a recessed outer surface received in the piston bushing and defining therebetween an axial pressure chamber which communicates with one of the longitudinal pressure chambers, the piston having an interior opening with a piston valve disposed therein and extending through a rear opening in a rear wall of said piston, the piston rear wall defining with the bushing a portion of the other longitudinal pressure chamber, the interior opening communicating with the axial pressure chamber, the rear opening of the piston and the piston valve communicating with the other of the pair of longitudinal pressure chambers, and an exterior pressure intensifying device disposed separate from the piston and communicating with the other longitudinal pressure chamber, actuation pressure being communicated to the one longitudinal pressure chamber and exterior pressure device so that the exterior pressure device communicates a fluid pressure output to the other longitudinal pressure chamber.

BRIEF DESCRIPTION OF THE DRAWINGS

One way of carrying out the invention is described in detail below with reference to the drawings which illustrate an embodiment in which:

FIG. 1 is a section view of the hydraulic brake adjuster and piston assembly of the present invention.

DETAILED DESCRIPTION OF THE PREFERRED EMBODIMENT

The hydraulic brake adjuster of the present invention is indicated generally by reference numeral 10. Hydraulic brake adjuster 10 comprises an exterior pressure device 11 which is exterior to a piston 60 and which has a differential area piston 12 received within a cavity 14 and extending into the smaller diameter opening 16. Differential area piston 12 is biased by spring 18 toward inlet 20 which receives actuation fluid pressure through connection 22. Piston 12 has a stop 24 disposed thereabout in order to limit the amount of displacement by actuation fluid pressure received at inlet 20. Exterior pressure device 11 includes an outlet 26 communicating fluid pressure displaced from opening 16 by piston 12 to an inlet 28 of a piston housing 32. Piston housing 32 is part of the piston assembly indicated generally by reference numeral 30. Assembly 30 includes a piston bushing 40 threadably received within a cavity 34 of housing 32. Bushing 40 has a pair of ring seals 42 which engage the cavity surface 36 to define therebetween a longitudinal pressure chamber 50 and a substantial portion of another longitudinal pressure chamber 95. Longitudinal pressure chamber 50 receives actuation fluid pressure by means of a housing inlet 31. A piston 60 is received within bushing 40, bushing 40 having a ring seal 44 engaging an exterior end 62 of piston 60, and piston 60 has a ring seal 64 engaging an interior end of bushing 40 so that the seals 44 and 64 define therebetween an axial pressure chamber 70. Axial pressure chamber 70 communicates by means of radial openings 48 with the longitudinal pressure chamber 50. Piston 60 includes a rear wall 66 having a rear opening 68 with a ring seal 69. Piston 60 includes a front wall 72 having a front opening 74 with a ring seal 76. Disposed between seals 69 and 76 is a differential area piston valve 90 which extends through the openings 68 and 74. Piston valve 90 includes a flange 92 receiving a spring 94 which biases valve 90 toward rear wall 66. Piston valve 90 may also comprise a poppet construction received at a seat/opening 68. Piston 60 includes radial openings 63 which provide communication between an interior chamber 97 of the piston and the axial pressure chamber 70. The cavity surface 36, piston bushing 40, and rear wall 66 define a portion of longitudinal pressure chamber 95. Longitudinal pressure chamber 95 receives by means of inlet 28 the fluid displaced by exterior pressure device 11.

The hydraulic brake adjuster and piston assembly is provided so that exterior pressure device 11 has a has larger size cavity 14 receiving the actuation fluid pressure and a smaller sized opening 16 communicating fluid to longitudinal pressure chamber 95 of piston assembly 30. It should be clearly understood that one or more piston assemblies 30 may be connected with an appropriately sized hydraulic brake adjuster pressure device 11. The piston valve 90 acts as a relief valve which will be opened at a hydraulic pressure less than the normal operating pressure and which is closed at a hydraulic pressure substantially greater than the maximum system return pressure. The hydraulic brake adjuster and piston assembly operates to provide an approximately constant running clearance throughout the operational life of the brake. In the normal released braking state, the differential area valve piston 12 and piston valve 90 are in the returned or at-rest state as illustrated in FIG. 1. Upon an increase of inlet or actuation fluid pressure in line connections 22 and 23, the increased pressure being above the maximum system return pressure, exterior pressure device 11 is actuated so that piston 12 moves against spring 18. Movement of piston 12 continues as the actuation fluid pressure through line 22 increases, until the larger area of piston 12 engages the stop 24 which prohibits further movement of piston 12. During this increase of actuation fluid pressure, any movement of piston 60 during this time will occur in a direction tending to actuate the brake wherein piston 60 engages a friction member, because of the fluid displaced from opening 16 by piston 12 which enters longitudinal pressure chamber 95 via inlet opening 28 and connection 27.

Due to the differential area piston 12, the output pressure in connection 27 and chamber 95 is greater than the actuation pressure in lines 22 and 23. The piston 60 is displaced because pressure in chamber 95 is greater than the pressure in chamber 70 and the rear area of piston 60 is greater than the area exposed to the pressure in chamber 70. Actuation of piston 60 occurs until valve piston 12 engages stop 24 whereupon increased inlet pressure may tend to deactuate slightly piston 60. A further increase in fluid pressure will cause valve 90 to open. The pressure in chamber 95 which is exerted on the rear area of piston valve 90 is combined with the pressure in chamber 97 times the area differential between the front and rear of piston valve 90 to cause displacement of piston valve 90. The further increase in the actuation fluid pressure causes piston valve 90 to begin moving against spring 94 so that at some fluid pressure level less than the normal operating pressure, piston valve 90 opens and permits fluid in interior opening 97 to flow through opening 69 and enter the longitudinal pressure chamber 95. When fluid pressure enters chamber 95, fluid pressures maintain equalization on both sides of rear wall 66. At this time, piston valve 90 moves to a fully open position because fluid pressure on piston valve 90 exceeds the force of spring 94. The piston 60 moves outwardly of cavity 34 to further actuate or displace a braking component (not shown). The piston actuation force is provided by fluid pressure acting upon the outer diameter of piston 60. Upon the release of actuation fluid pressure, the fluid pressure at inlet 31, longitudinal pressure chamber 50, axial pressure chamber 70, and interior chamber 97 decreases until piston 90 closes. At this time, differential area intensifier piston 12 remains displaced against the stop 24. Upon further decrease of actuation fluid pressure, piston 12 begins to move toward inlet 20 by means of the force of spring 18. The displacement of piston 12 toward inlet 20 continues during the reduction of actuation fluid pressure until piston 12 reaches a fully retracted position. Fluid is removed from longitudinal pressure chamber 95 and thereby allows the piston 60 to be retracted from the braking component (not shown). Upon the reduction of actuation fluid pressure to normal system return pressure, the running clearance between the braking component and the part to be braked is established, with the distance of the running clearance governed by the volume of fluid displacement effected by exterior pressure device 11. As follows from the above description, the fluid actuation force effected upon piston 60 does not increase linearly relative to the actuation fluid pressure communicated through lines 22 and 23. The actuation pressure communicated to piston 60 increases abruptly as piston valve 90 opens. Therefore, the present invention may be utilized with braking assemblies requiring a constant pressure brake application, such as helicopter rotor brakes, or other applications not requiring a linear relationship between the brake actuation pressure and the fluid pressure communicated to the piston.

Other provisions of the invention or variations will become apparent to those skilled in the art and will suggest themselves from the specific applications of the invention. It is intended that such variations and revisions of the invention as reasonably to be expected on the part of those skilled in the art and to suit individual design preference and which incorporate the herein disclosed principles, will be included within the scope of the following claims as equivalents thereof.

I claim:

1. A hydraulic brake adjuster and piston assembly, comprising a piston housing having therein a cavity with a cavity surface, a piston bushing disposed in the cavity and defining substantially with the cavity surface a pair of longitudinal pressure chambers, a piston with a recessed outer surface received in the piston bushing and defining therebetween an axial pressure chamber which communicates with one of the longitudinal pressure chambers, the piston having a substantially closed interior chamber with a piston valve disposed therein and extending through a rear opening in a rear wall of said piston, the piston rear wall defining with the bushing a portion of the other longitudinal pressure chamber, the substantially closed interior chamber communicating by means of an opening with the axial pressure chamber and the interior chamber normally isolated from the other longitudinal pressure chamber, the rear opening of the piston and the piston valve communicating with the other of the pair of longitudinal pressure chambers, and an exterior pressure device disposed separate from the piston and communicating with the other longitudinal pressure chamber, actuation pressure being communicated to the one longitudinal pressure chamber and exterior pressure device so that the exterior pressure device communicates a fluid pressure output to the other longitudinal pressure chamber.

2. The hydraulic brake adjuster and piston assembly in accordance with claim 1, wherein the piston bushing includes seals thereabout, the one longitudinal pressure chamber being defined axially between the seals.

3. The hydraulic brake adjuster and piston assembly in accordance with claim 2, wherein the piston bushing and piston include a pair of seals therebetween, the axial pressure chamber being defined axially between the pair of seals.

4. The hydraulic brake adjuster and piston assembly in accordance with claim 3, wherein the piston valve comprises a differential area piston biased by spring means toward the rear opening.

5. The hydraulic brake adjuster and piston assembly in accordance with claim 4, wherein the exterior pressure device comprises a differential area piston biased by a spring toward an inlet and away from a stop.

6. The hydraulic brake adjuster and piston assembly in accordance with claim 5, wherein the stop is cylindrical shaped and disposed about the differential area piston of the exterior pressure device.

7. The hydraulic brake adjuster and piston assembly in accordance with claim 6, wherein the piston in the piston bushing includes a front axial wall having a front opening through which extends a front portion of the piston valve.

8. The hydraulic brake adjuster and piston assembly in accordance with claim 6, wherein the piston bushing includes threads threadably received by corresponding threads in the piston housing.

9. The hydraulic brake adjuster and piston assembly in accordance with claim 8, wherein the exterior pressure device receives actuation pressure which displaces the differential area piston of the device against the stop to displace fluid to the other longitudinal pressure chamber.

* * * * *